US010061791B2

(12) United States Patent
Phanishayee et al.

(10) Patent No.: US 10,061,791 B2
(45) Date of Patent: Aug. 28, 2018

(54) DATA MANAGEMENT FOR CONNECTED DEVICES

(71) Applicant: Microsoft Technology Licensing, LLC, Redmond, WA (US)

(72) Inventors: Amar Phanishayee, Seattle, WA (US); Ratul Mahajan, Seattle, WA (US); Rayman Preet Singh, Waterloo (CA); Trinabh Gupta, Austin, TX (US); Jaeyeon Jung, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 315 days.

(21) Appl. No.: 14/340,514

(22) Filed: Jul. 24, 2014

(65) Prior Publication Data
US 2015/0120749 A1 Apr. 30, 2015

Related U.S. Application Data

(60) Provisional application No. 61/897,755, filed on Oct. 30, 2013.

(51) Int. Cl.
*G06F 17/30* (2006.01)
*G11B 27/034* (2006.01)
*G11B 27/11* (2006.01)

(52) U.S. Cl.
CPC .. *G06F 17/30321* (2013.01); *G06F 17/30504* (2013.01); *G11B 27/034* (2013.01); *G11B 27/11* (2013.01)

(58) Field of Classification Search
CPC ......... G06F 17/30156; G06F 17/30283; G06F 17/30321; G06F 17/30504; G11B 27/034; G11B 27/11
See application file for complete search history.

(56) References Cited

U.S. PATENT DOCUMENTS

| 5,689,442 A | 11/1997 | Swanson et al. |
| 7,930,559 B1 * | 4/2011 | Beaverson .......... G06F 11/1453 711/111 |
| 8,214,517 B2 | 7/2012 | Dubnicki et al. |

(Continued)

FOREIGN PATENT DOCUMENTS

CN 102446184 B 6/2013

OTHER PUBLICATIONS

Second Written Opinion Issued in PCT Application No. PCT/US2014/062760, dated Sep. 23, 2015, 7 Pages.
(Continued)

*Primary Examiner* — Tarek Chbouki
(74) *Attorney, Agent, or Firm* — Drinker Biddle & Reath LLP

(57) ABSTRACT

Techniques and constructs to facilitate data management can provide improved response time and space efficiency for time-series data such as from connected devices. The constructs may enable receiving a stream of time-series data comprising a plurality of objects and a time identification associated with each of the objects. One or more tags are associated with the objects. The constructs may also chunk the stream into a plurality of contiguous chunks, each including a plurality of objects, create an index associating the time identification and the one or more tags, transmit the chunks to a first, remote storage, and then store the index.

17 Claims, 6 Drawing Sheets

(56) References Cited

U.S. PATENT DOCUMENTS

| | | | |
|---|---|---|---|
| 8,447,740 B1* | 5/2013 | Huang | G06F 17/30156 707/640 |
| 8,527,531 B2 | 9/2013 | Tanaka et al. | |
| 8,825,626 B1* | 9/2014 | Wallace | G06F 17/30994 707/697 |
| 2008/0013830 A1* | 1/2008 | Patterson | G06F 11/1451 382/173 |
| 2008/0042830 A1 | 2/2008 | Chakraborty et al. | |
| 2008/0133561 A1* | 6/2008 | Dubnicki | G06F 11/1453 |
| 2008/0246841 A1 | 10/2008 | Chen et al. | |
| 2009/0089845 A1 | 4/2009 | Akers et al. | |
| 2009/0136208 A1* | 5/2009 | Gilboa-Solomon | G06F 17/30817 386/248 |
| 2010/0015912 A1* | 1/2010 | Tucker | G08B 13/19656 455/3.06 |
| 2010/0023259 A1* | 1/2010 | Krumm | G01C 21/20 701/532 |
| 2010/0070992 A1* | 3/2010 | Morris | H04N 7/17336 725/32 |
| 2011/0023044 A1* | 1/2011 | Krutyolkin | G06F 9/4881 718/102 |
| 2012/0131025 A1 | 5/2012 | Cheung et al. | |
| 2012/0197852 A1 | 8/2012 | Dutta et al. | |
| 2012/0272281 A1* | 10/2012 | Ha | H04N 21/23439 725/110 |
| 2013/0080267 A1 | 3/2013 | McGowan | |
| 2013/0124465 A1 | 5/2013 | Pingel et al. | |
| 2013/0132385 A1 | 5/2013 | Bullotta et al. | |

OTHER PUBLICATIONS

Office Action Issued in Colombian Patent Application No. 16-127856, a counterpart foreign application of U.S. Appl. No. 14/340,514, dated Jun. 13, 2016, 3 pages (w/o English Translation).

Office Action Issued in Russian Patent Application No. 2016116811, dated Jun. 1, 2016, 4 Pages.

Abadi et al., "The Design of the Borealis Stream Processing Engine," In Proceedings of Second Biennial Conference on Innovative Data Systems Research, published Jan. 4, 2005, retrieved at <<http://www.cs.harvard.edu/~mdw/course/cs260r/papers/borealis-cidr05.pdf>> 13 pages.

Abu-Libdeh et al., "RACS: A Case for Cloud Storage Diversity," In Proceedings of the 1st ACM Symposium on Cloud Computing, published Jun. 10, 2010, retrieved at <<http://dl.acm.org/citation.cfm?id=1807165>> 11 pages.

Adya et al., "Farsite: Federated, Available, and Reliable Storage for an Incompletely Trusted Environment," In Proceedings of the 5th Symposium on Operating Systems Design and Implementation, published Dec. 2002, retrieved at <<http://research.microsoft.com/en-us/groups/sn-res/osdi2002.pdf>> 14 pages.

Amazon Simple Storage Services, retrieved on Feb. 17, 2014 at <<https://aws.amazon.com/s3/>> 5 pages.

Birt et al., "Disaggregating categories of electrical energy end-use from whole-house hourly data. Energy and Buildings," 2012, 10 pages.

Bowers et al., "Hail: A High-Availability and Integrity Layer for Cloud Storage," In Proceedings of the 16th ACM Conference on Computer and Communications Security, published Nov. 9, 2009, retrieved at <<http://dl.acm.org/citation.cfm?id=1653686>> 12 pages.

Brush et al., "Digital Neighborhood Watch: Investigating the Sharing of Camera Data Amongst Neighbors," In Proceedings of the Conference on Computer Supported Cooperative Work, published Feb. 23, 2013, retrieved at <<http://dl.acm.org/citation.cfm?id=2441853>> 8 pages.

Caine et al., Digiswitch: A Device to Allow Older Adults to Monitor and Direct the Collection and Transmission of Health Information Collected at Home, In Journal of Medical Systems, published Oct. 30, 2011, retrieved at <<http://www.cs.indiana.edu/~connelly/Papers/J10_Digiswitch.pdf>> 15 pages.

Carney et al., "Monitoring Streams: A New Class of Data Management Applications," In Proceedings of the 28th International Conference on Very Large Data Bases, published Aug. 20, 2002, retrieved at <<http://dl.acm.org/citation.cfm?id=1287389>> 12 pages.

Control4, retrieved on Feb. 17, 2014 at <<http://www.control4.com/>> 3 pages.

Dixon et al., "An Operating System for the Home," In Proceedings of the 9th USENIX Symposium on Networked Systems Design and Implementation, published Apr. 2012, retrieved at <<https://www.usenix.org/system/files/conference/nsdi12/nsdi12-final149.pdf>> 16 pages.

Dropbox: Your Stuff, Anywhere, retrieved on Feb. 17, 2014 at <<https://www.dropbox.com/>> 2 pages.

Feldman et al., "SPORC: Group Collaboration Using Untrusted Cloud Resources," In 9th USENIX Symposium on Operating Systems Design and Implementation, published Oct. 4, 2010, retrieved at <<https://www.usenix.org/legacy/event/osdi10/tech/full_papers/Feldman.pdf>> 14 pages.

Firth et al. "Identifying Trends in the Use of Domestic Appliances From Household Electricity Consumption Measurements," In Energy and Buildings, vol. 40, retrieved on Feb. 17, 2014 at <<https://dspace.lboro.ac.uk/dspace-jspui/bitstream/2134/5286/3/EngyBld08%2040%28%29Firth.pdf>> 11 pages.

Fu, "Integrity and Access Control in Untrusted Content Distribution Networks," In PhD Dissertation, Massachusetts Institute of Technology, published Sep. 2005, retrieved at <<http://pdos.csail.mit.edu/papers/fu-phd-thesis.pdf>> 143 pages.

Fu et al., "Key Regression: Enabling Efficient Key Distribution for Secure Distributed Storage," In Proceedings of Network and Distributed Systems Security Symposium, published Feb. 2006, retrieved at <<http://scholarworks.umass.edu/cgi/viewcontent.cgi?article=1147&context=cs_faculty_pubs>> 39 pages.

Geambasu et al., "Homeviews: Peer-To-Peer Middleware for Personal Data Sharing Applications," In Proceedings of the ACM SIGMOD International Conference on Management of Data, published Jun. 11, 2007, retrieved at <<http://dl.acm.org/citation.cfm?id=1247508>> 12 pages.

Goh et al., "SiRiUS: Securing Remote Untrusted Storage," In Proceedings of the Network and Distributed Systems Security Symposium, published Feb. 7, 2003, retrieved at <<http://citeseerx.ist.psu.edu/viewdoc/download?doi=10.1.1.104.6458&rep=rep1&type=pdf>> 15 pages.

Gupta et al, "Towards a Storage System for Connected Homes," In Workshop on Large-Scale Distributed Systems and Middleware, published Nov. 2013, retrieved at <<http://research.microsoft.com/pubs/204876/LADIS2013-Bolt-CR.pdf>> 6 pages.

Kallahalla et al, "Plutus: Scalable Secure File Sharing on Untrusted Storage," In Proceedings of the 2nd Conference on File and Storage Technologies, published Mar. 31, 2003, retrieved at <<http://citeseerx.ist.psu.edu/viewdoc/download;jsessionid=EA9CC2CF1-A98CAB69FD9904F4E783BFC?doi=10.1.1.12.5598&rep=rep1&type=pdf>> 13 pages.

Kolter et al., "Energy Disaggregation Via Discriminative Sparse Coding," In Advances in Neural Information Processing Systems, published Jan. 2010, retrieved at <<http://www.cs.cmu.edu/~zkolter/pubs/kolter-nips10.pdf>> 9 pages.

Kwikset Door Locks, retrieved on Feb. 17, 2014 at <<http://www.kwikset.com/>> 1 page.

Mi Casa Verde, retrieved on Feb. 17, 2014 at <<http://www.micasaverde.com/>> 22 pages.

Microsoft Skydrive, retrieved on Feb. 17, 2014 at <<https://skydrive.live.com>> 1 page.

Microsoft Windows Azure, retrieved on Feburary 17, 2014 at <<https://www.windowsazure.com/en-us/>> 3 pages.

Nest, retrieved on Feb. 17, 2014 at <<https://nest.com/>> 3 pages.

OpenTSDB, retrieved on Feb. 17, 2014 at <<http://www.opentsdb.net/>> 3 pages.

Philips Hue, retrieved on Feb. 17, 2014 at <<http://www.meethue.com/en-US>> 8 pages.

protobuf-net. Fast, Portable, Binary Serialization for .NET, retrieved on Feb. 17, 2014 at <<https://code.google.com/p/protobuf-net/>> 2 pages.

(56) References Cited

OTHER PUBLICATIONS

SmartThings, retrieved on Feb. 17, 2014 at <<http://www.smart-things.com/>> 6 pages.
The Internet of Things, retrieved on Feb. 17, 2014 at <<http://share.cisco.com/internet-of-things.html>> 2 pages.
International Preliminary Report on Patentability for PCT/US2014/062760 dated Jan. 11, 2016, 8 pages.
The PCT Search Report dated Feb. 19, 2015 for PCT application No. PCT/US2014/062760, 9 pages.
"Office Action Issued in Colombian Patent Application No. 16-127856", dated Jan. 17, 2018, 9 Pages.

* cited by examiner

DATA MANAGEMENT FOR CONNECTED DEVICES

CROSS-REFERENCE TO RELATED APPLICATIONS

This application claims the benefit of U.S. Provisional Application No. 61/897,755, filed Oct. 30, 2013, the entire disclosure of which is herein incorporated by reference.

BACKGROUND

Buildings, such as homes, warehouses, and offices, are increasingly filled with connected devices. For example, surveillance cameras, temperature sensors, and/or motion sensors have become more commonplace. Accordingly, applications that manipulate data from those devices have also become more prevalent. However, systems previously implemented or proposed for data storage, retrieval, and sharing in such applications can be insufficient and inefficient.

SUMMARY

This application describes an improved framework and methods for managing, e.g., storing, manipulating, and/or retrieving, data in connected device systems. In at least one example, the techniques described herein format and store data received from a home monitoring system, which may include surveillance cameras, motion sensors, temperature sensors, and so forth. In some examples, the methods may tag the data and create an index of the tags/data. The index and data may be stored remotely, such as on cloud-based storage. In some implementations, the index is fetched locally and queries are issued locally on the index before fetching relevant parts of the data. The following discussion describes these and other non-limiting examples of data handling across connected monitoring device systems. Some implementations may allow for application design flexibility, for sharing of information across users, and/or for improved protection of data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
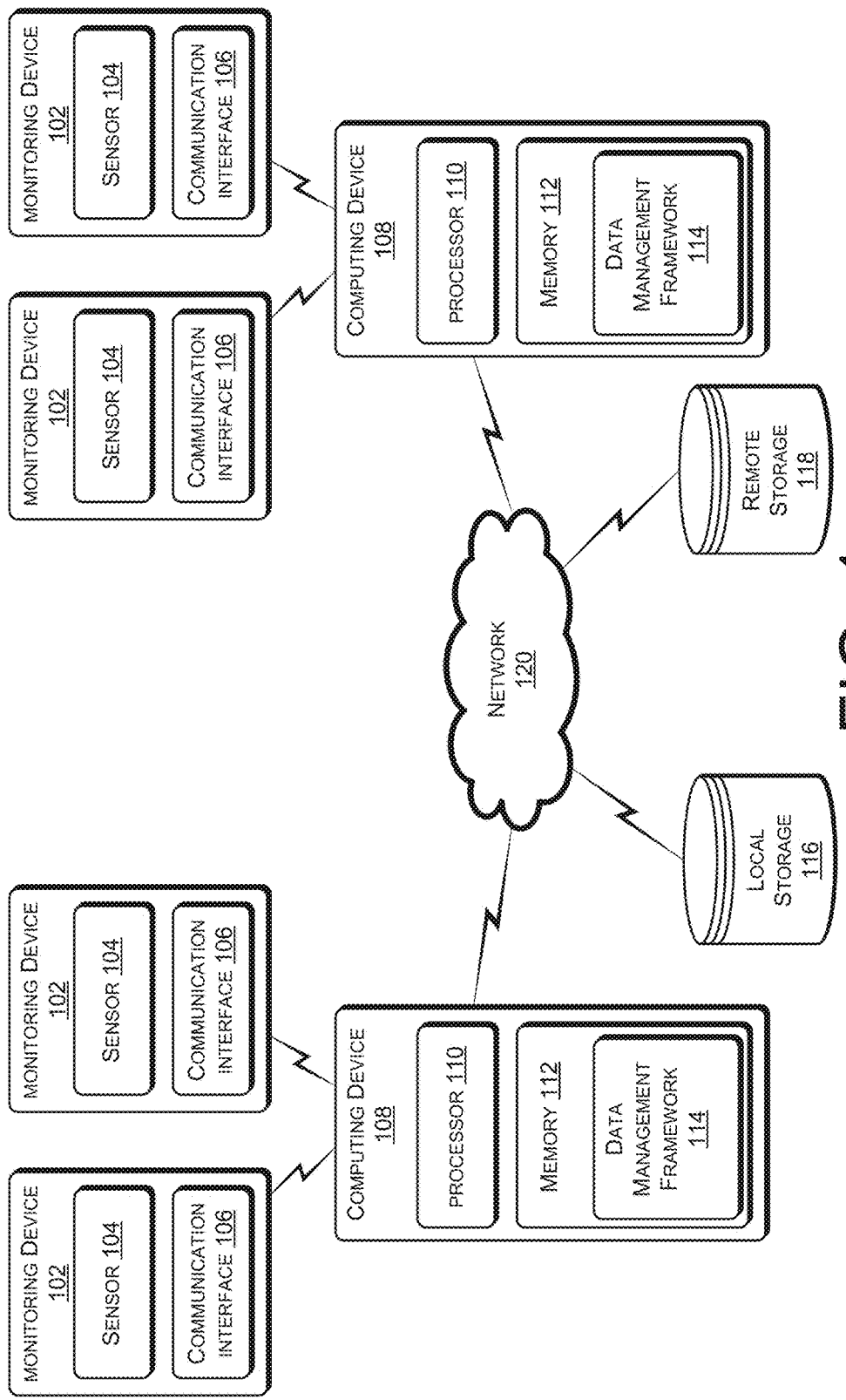
FIG. 1 is a block diagram depicting an example environment for implementing data management for connected devices as described herein.

Examples described herein provide techniques and constructs to manage data, such as data from connected devices, using resources including, for example, processing units and accelerators. Such resources may be implemented using specialized programming and/or hardware programmed with specific instructions to implement the specified functions. For example, resources may have different execution models as is the case for graphics processing units (GPUs) and computer processing unit (CPUs).

In implementations of this disclosure, a method of storing information includes receiving from a plurality of devices a stream of time-series data comprising a plurality of objects and a time identification associated with each of the objects. The objects may be, for example, values (e.g., temperature values), images (e.g., from a surveillance camera), and/or a binary indication (e.g., presence/absence from a motion detector).

The method may also include associating one or more tags with each of the objects. In some implementations, the tags may describe attributes of the objects and may be searchable, for example, to retrieve the tagged objects at a later date or time. The tags may be applied at the device/sensor, such as by an application running on the device/sensor. In other implementations, a user may manually input the tags or the tags may otherwise be associated with the data stream other than on the device/sensor. The method also may include chunking the stream of tagged objects into a plurality of contiguous chunks, with each of the contiguous chunks including a plurality of the objects. Techniques according to this disclosure may compress and/or encrypt the chunks, and store the chunks. In some implementations, the method also includes creating an index for the data stream. The index may include an association between the time identifications and the tags, and the methods of this disclosure may store the index separately from the chunks. In one example, the chunks may be stored remotely, whereas the index is searched locally, in other example implementations, a user may make a local query of the index, and the method may retrieve the chunk(s) having object(s) satisfying the query.

The techniques described herein may also utilize user preferences to store data. For example, a user may decide whether data originating from their associated devices is available to other users. That is, users will authorize access to information originating from them. The user may also select a storage type of the information, for example, to tailor the data to the user's device and/or storage constraints, in other aspects, data stored according to the frameworks described herein may be confidential, tamper evident, and/or fresh.

Examples of the data management framework are presented in greater detail in the following description and the accompanying figures.

Examples described herein provide techniques and constructs applicable to maintaining and manipulating data from devices/sensors. In various instances, a processing unit configured via programming from modules or APIs to perform techniques as described herein can include one or more of a GPU, a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Various examples, scenarios, and aspects are described further with reference to FIGS. 1-6.

FIG. 1 illustrates an example environment 100 that may be used to implement data management and handling in surveillance systems, including data storage and retrieval. The environment 100 includes multiple monitoring devices 102 disposed at a location to be surveyed. In the illustrated example, two locations are to be surveyed, so there are two sets of monitoring devices 102. The monitoring devices 102 individually include a sensor 104 and a communication interface 106 for outputting a stream of time-series data including objects sensed by the sensor 104 and time stamps associated with the objects. Example monitoring devices 102 may include, but are not limited to, cameras, motion sensors, temperature sensors, and so forth.

The environment 100 also includes a plurality of computing devices 108, each associated with one or more monitoring devices, in one implementation, each computing device 108 is associated with a different user or a different location. For example, in the instance of the monitoring devices 102 being home surveillance devices, each home has its own computing device 108. In other examples, only a single computing device 108 may be used, for example, for multiple homes and/or surveillance devices, in one example, the computing device 108 could reside at or otherwise be controlled by a third party service provider, such as a home security or surveillance company.

The computing device(s) 108 can belong to a variety of categories or classes of devices, such as traditional client-type devices, desktop computer-type devices, mobile-type devices, special purpose-type devices, embedded-type devices, and/or wearable-type devices. The computing device(s) 108 can include a diverse variety of device types and are not limited to any particular type of device. The computing device(s) 108 can include, but are not limited to, telecommunication devices such as mobile phones, tablet computers, mobile phone/tablet hybrid devices, personal data assistants (PDAs), laptop computers, other mobile computers, wearable computers, implanted computing devices, desktop computers, personal (e.g., desktop) computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device.

Each of the computing devices 108 has at least one processor 110 and a memory 112. Although only one processor 110 and one memory 112 are illustrated, there may be multiple processors 110, multiple memory devices 112, or both. The processor(s) 110 may be a single processing unit or a number of units, each of which could include multiple different processing units. The processor(s) 110 may include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-programmable Gate Array (FPGA), an Application-specific Integrated Circuit (ASIC), an Application-specific Standard Products (ASSP), a state machine, a Complex Programmable Logic Device (CPLD), other logic circuitry, a system on chip (SoC), and/or any other devices that perform operations based on instructions. Among other capabilities, the processor(s) 110 may be configured to fetch and/or execute computer-readable instructions stored in the memory 112.

The memory may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

Executable instructions stored on the computer-readable media of the memory 112 can include, for example, an operating system, a data management framework 114, and/or other modules, programs, or applications that are loadable and executable by the processing unit(s) 110. Alternatively, or in addition, the functionally described herein can be performed, at least in part, by one or more hardware logic components such as accelerators. For example, and without limitation, illustrative types of hardware logic components that can be used include FPGAs, ASICs, ASSPs, SOCs, CPLDs, etc. For example, an accelerator can represent a hybrid device, such as one from ZYLEX or ALTERA that includes a CPU course embedded in an FPGA fabric.

As also illustrated in FIG. 1, the computing devices 108 are also communicatively coupled to each other, as well as to local storage 116 and remote storage 118, for example, via a network 120.

For example, the network(s) 120 can include public networks such as the Internet, private networks such as an institutional and/or personal intranet, or some combination of private and public networks. The network(s) 120 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network(s) 120 can utilize communications protocols, including packet-based and/or datagram-based protocols such as internet protocol (IP), transmission control protocol (TCP), user datagram protocol (UDP), or other types of protocols. Moreover, the network(s) 120 can also include a number of devices that facilitate network communications and/or form a hardware basis for the networks, such as switches, routers, gateways, access points, firewalls, base stations, repeaters, backbone devices, and the like.

In some examples, the network(s) 120 can further include devices that enable connection to a wireless network, such as a wireless access point (WAP). The network(s) may support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Local storage 116 generally refers to memory and/or data storage such as databases associated with the computing device(s) 108. In one example, local storage may refer to memory stored on a hard drive of the computing device(s) 108. In some other implementations, the local storage 116 may refer to a database and/or memory that share a network with one or more of the computing device(s) 108. The local storage 116 may be on the same side of a firewall as the computing device(s) 108.

Remote storage 118 generally refers to memory and/or data storage remote from the computing device(s) 108. Remote storage 118 may include storage at a separate location or cloud-based storage.

As illustrated, both computing devices 108-1, 108-2 may access the same storage 116, 118. In some implementations of this disclosure a user associated with one computing device 108-1 may be authorized to access information originating from a, second computing device 108-2. For example, in the instance of each computing device 108 being associated with a house in a certain neighborhood and the monitoring device 102 including a surveillance camera, it may be possible for one house in the neighborhood to download and view surveillance footage from a neighbor's surveillance camera. Of course, the owner/user of the respective device 108-1, 108-2 would have to authorize such access by the neighbor.

Figure 2:
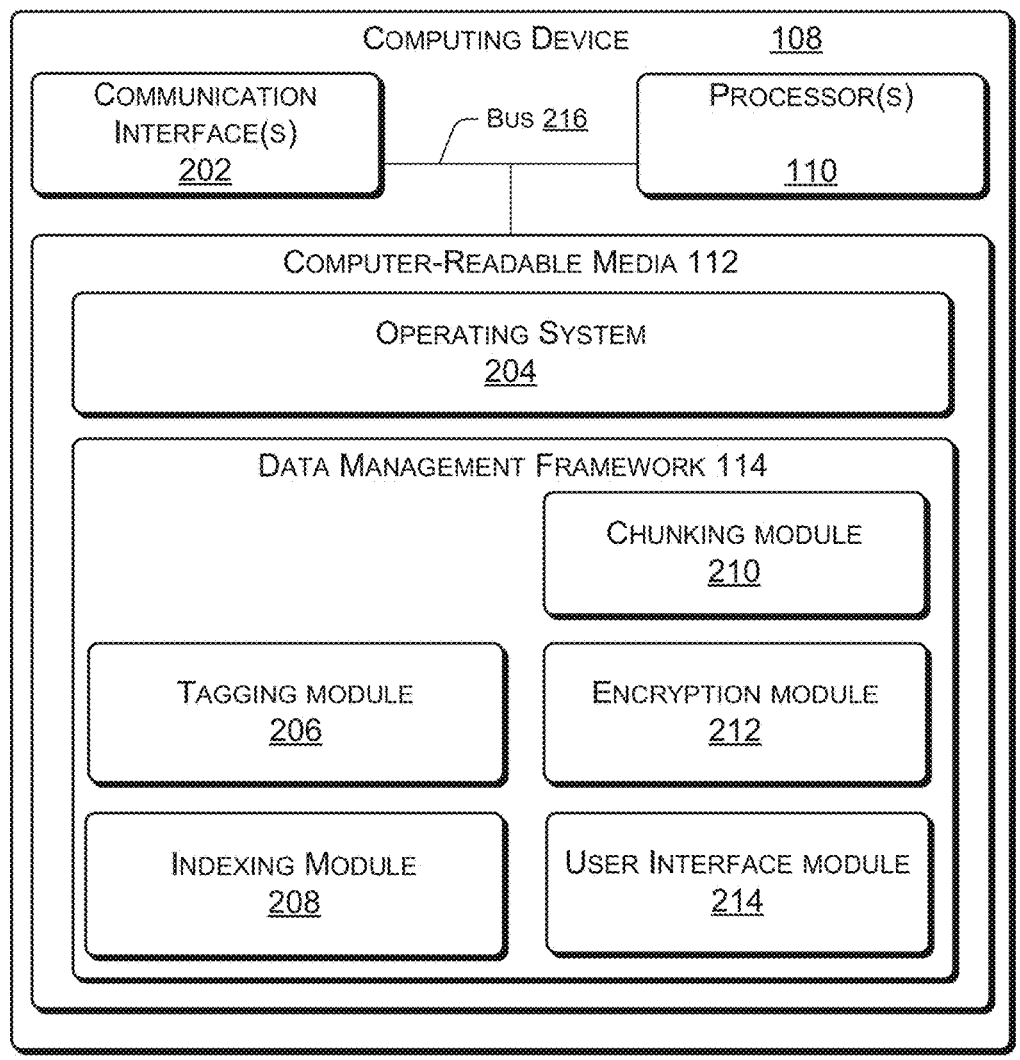
FIG. 2 is a block diagram depicting an example computing device, such as a computing device illustrated in the environment of FIG. 1.

FIG. 2 illustrates the computing device 108 in more detail. As illustrated, in addition to the processor 110 and memory 112, the computing device 108 also includes a communication interface 202. The communication interface 202 communicates with the devices 102, 108, as well as with the local storage 114 and the remote storage 116. The interface 202 may include a number of different interfaces, such as wired or wireless interfaces. Moreover, the interface 202 may include one or more input-output (I/O) interfaces to allow the computing device 108 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). The interface 202 may also include one or more network interface(s), which can represent, for example, network interface controllers (NICs) or other types of transceiver devices to send and receive communications over a network.

As also illustrated in FIG. 2, the memory 112 includes an operating system 204 that is configured to manage hardware and services within and coupled to a device for the benefit of other modules, components and devices.

The memory 112 also includes the data management framework 114. The framework 114 may include one or more software and/or firmware module(s) and/or APIs, which are executable on the processor(s) 110 to implement various functions, including data management functions and techniques described herein. The modules and/or APIs are illustrated as blocks 206, 208, 210, 212, and 214, although this is just an example and the number of blocks can vary higher or lower. Functionality described associated with blocks 206, 208, 210, 212, and 214 can be combined to be performed by a fewer number of modules and/or APIs or it can be split and performed by a larger number of modules and/or APIs. While the modules/APIs are described as being software and/or firmware executable on a processor, in other examples, any or all of the modules may be implemented in whole or in part by hardware (e.g., as an ASIC, a specialized processing unit, etc.) to execute the described functions.

In the example of FIG. 2, block 206 generally represents a tagging module with logic to program the processor 110 to tag data streams received from a sensor or sensing device, such as a monitoring device 102. For example, the tags may include textual descriptions of the information in the data stream. The tags may be application specific. For example, when the data stream includes images from a camera, such as a surveillance camera, the tagging module may apply one or more tags corresponding to objects in the image. For instance, tags such as "automobile," "animal," and/or "person" may be applied to those images in the data stream that include such features. In some implementations, the tagging module may operate at the monitoring device 102 or the sensor 104. In such implementations, the device 108 may receive an already-tagged data stream.

Block 208 generally represents an indexing module with logic to program the processing unit 110 to create an index of the tagged data stream. The index may include an association between a time stamp on the data and the tags associated with the objects in the data. The index is searchable, and may be maintained separately from the data stream. In one implementation, the data stream may be stored remotely, such as in cloud-based storage, while the index resides locally.

Block 210 represents a chunking module with logic to program the processor 110 to divide the data stream into a plurality of contiguous chunks. The chunks each contain object/tag pairs for a contiguous time. The size of the chunks may be configurable, for example, by an application developer. The size may be based on various factors, including, but not limited to the size of the data objects. The chunks may be otherwise processed before storage. For example, chunks may be compressed for more efficient storage. Chunks will be described below in more detail, particularly with reference to FIG. 4.

Block 212 represents an encryption module with logic to program the processing unit 110 to encrypt the chunks. In some examples, the chunks are intended to be stored remotely, and the encryption module may encrypt the chunks prior to storage. Although not illustrated, the encryption module may communicate with a trusted key server (not shown) or the like to establish a scheme for encrypting/decrypting the chunks. Example schemes will be discussed in more detail, below.

Block 214 represents a user interface module with logic to program the processing unit 110 for instructing display of one or more interfaces for a user to interact with the systems described herein. For example, the module may, in conjunction with a display or other user interface, provide an interface that allows a user to set rules relative to the data stream. For example, through the interface, the user may define a chunk size, dictate a type of storage to be used for the chunks, or input other properties or policies relative to the data streams.

In other implementations, the user interface module may also facilitate an interface through which a user may query an index, such as the index created by the indexing module described above. In some implementation, the index may be associated with data streams from the user's devices, while in other implementations the index may be associated with data streams from other, i.e., not owned/operated by the user, monitoring devices. For instance, a homeowner may be able to query an index of surveillance footage from other homes in the neighborhood. Of course, the user and the neighbors would have the option to allow their footage to be made accessible or to be kept private. Such options may be exercised through controls facilitated by the user interface module. Moreover, the chunks may be encrypted, with users being authorized to access the data, for example, through receipt of keys.

Although the modules are illustrated as residing in the memory 112 of the computing device 108, such is not required. Some or all of the modules may reside other than at the computing device 108. For example, the tagging module, or a module performing a similar tagging scheme may be implemented at the monitoring device 102, such that the stream output from the monitoring device 102 already includes the tags. Similarly, the tagging may be done by an application operating between the monitoring device 102 and the computing device 108. Similar modifications will be apparent to those having ordinary skill in the art, with the benefit of this disclosure.

The computing device 108 as illustrated also includes a bus 216, which in some instances can include one or more of a system bus, a data bus, an address bus, a PCI bus, a Mini-PCI bus, and any variety of local, peripheral, and/or independent buses. The bus 216 can operably connect the computer-readable media 112 to the processing unit(s) 110.

Figure 3:
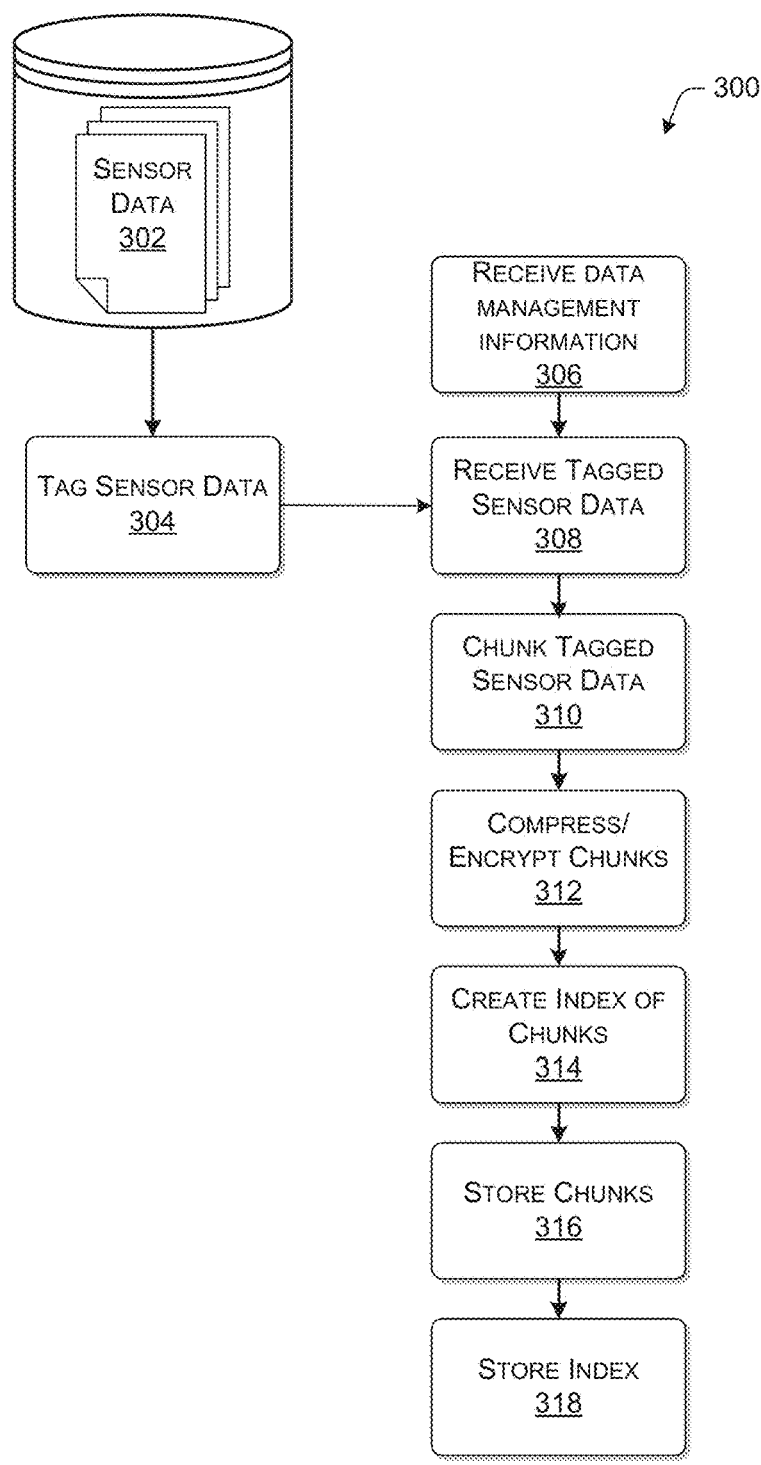
FIG. 3 is a block diagram depicting an example process architecture that can perform data management for connected devices.

FIG. 3 is a block diagram depicting an example architecture 300 of processes that the data management framework can perform to facilitate data management. In some examples the data management framework 114 will perform all processing. In other implementations, some or all of the architecture 300 could be performed at the device(s) 102, or elsewhere.

The architecture 300 generally includes sensor data 302, such as received from the sensing devices 102 described above. In example implementations, the sensor data 302 is a data stream in which each record has a timestamp and one or more tag-value pairs. For example, a data stream may take the form <timestamp, <value1>, [<value2>, ... ]>. Data of this type may be written by a single writer, e.g., the monitoring device 102, and the single writer may only generate new data, e.g., the writer may not perform random-access updates or deletions.

The architecture 300 includes tagging the sensor data 302 at 304. The tags generally may include information about an object type of data in the data stream. For example, for a data stream from a surveillance camera, tags may include "animal," "person," "automobile," and the like. In an energy data analytics system, tags may include "heating consumption," "water consumption," and so forth. Thus, the tags may be application specific. The application that tags the sensor data may run on the monitoring device 102, on the computing device 108, or somewhere else.

At 308, the architecture 300 receives the tagged sensor data. In example implementations of this disclosure, a data stream with tags has the form <timestamp, <tag1,value1>, [<tag2,value2>, ... ]>, Separate streams may be identifiable by a number of different criteria. For example, streams may be uniquely identified by the three-tuple: <HomeID, AppID, StreamID>. As noted above, the architecture 300 may include tagging the sensor data 304 at the device 108.

The architecture 300 also includes receiving data management information at 306. The data, management information generally includes any information that will control the manner in which data streams received from the sensing devices 102 will be handled. The data management information may be determined by a programmer, by the user, and/or by some other person or means.

In some examples, the data management information may identify a type of the data stream. In some implementations, the type of the data stream may differentiate based on size of the data values contained in the data stream. For example, temperature values and presence/absence indications are generally much smaller than image and video streams. Accordingly, some implementations will differentiate between small and large data values.

The data management information may alternatively or additionally specify where the data streams are to be stored. For example, data streams, parts of data streams or information associated with the data streams (such as an index, tags, and so forth) may be stored locally and/or remotely. Moreover, some or all of the data may be replicated.

The data management information may alternatively or additionally specify whether data, such as data streams or the like, are to be protected. For example, the data, may be encrypted or it may be unprotected. Moreover, one or more of numerous encryption schemes may be specified by the data management information.

The data management information may also or alternatively include information about access to data. In one example, users may grant or revoke read access to the data streams or associated information to other applications or users. For example, the information may instruct whether data from a device 102 associated with one user should be shared with other users. The data management information just described is intended only to provide examples. Other properties of the data may be stored in the data management information.

At 310, the architecture 300 chunks the tagged sensor data. As noted above, the data comprises a data stream of contiguous time stamped object entries. Data records may be recorded in a log per stream, which can enable efficient append-only writes. As used herein, a chunk is formed of a contiguous sequence of records or some length. According to aspects of this disclosure, the chunk is the basic unit of transfer of data for storage and retrieval. For example, data writers upload chunks instead of individual records, and readers fetch chunks. Although in some instances retrieving a chunk may be inefficient, e.g., because only a single, known record is of interest, experiments show that more frequently all records from a time window are of interest, and the chunk makes common queries with temporal locality more efficient.

At 312, the chunks may be compressed and or encrypted. Instructions relative to compressing and/or encrypting may be contained in the data management information received at 306. Generally, compressing the chunks enhances transfer and storage efficiency. In one example encryption scheme, a secret key generated by the owner (i.e., the owner of the device 102 or device 108) is used to encrypt the chunks. It may also be used to encrypt the index. This example uses lazy revocation to reduce computation overhead of cryptographic operations. Lazy revocation only prevents evicted readers from accessing future content, as the content before revocation may have already been accessed and cached by these readers. Also in this example, hash-based key regression is used as a key management scheme. This scheme allows the owner to share only the most recent key with authorized readers, based on which readers can derive all the previous keys to decrypt the content. A trusted key server may be used to distribute keys in this example. In this manner, once a stream is opened, all subsequent reads and writes occur directly between the storage server and the application. Also in this example, the owners may generate a hash of stream contents, which may be verified by the readers. Freshness may be checked by including a freshness time window as part of the stream metadata. This window may denote a time until when the data can be deemed fresh, and such time may be based on the periodicity with which owners expect to generate new data. The time window may be part of the data management information received in 306. The owners may periodically update and sign the time window, which readers can check against when a stream is opened.

At 314, the architecture 300 creates an index of the chunks in the stream. The index is searchable, e.g., by time and/or tags.

At 316 and 318, the chunks and the index are stored, respectively. In implementations of this disclosure, the chunks are stored remotely, e.g., on remote storage 118, and the index is stored or otherwise available locally, e.g., on local storage 116. In some implementations, the index is fetched from remote storage and a copy is stored locally at readers and writers. Data may still reside remotely. By storing the index locally, queries at endpoints may be made on the local index. Because an identification of the chunks may be made local, no computation (query engine) is required at the remote storage. In these implementations, the storage servers may only provide data read/write APIs. This may reduce the cost of the storage system.

Moreover, the separate storage of index and chunks may allow the data management framework 114 to relax its trust assumptions of storage servers. For example, by encrypting the chunks, some implementations may support untrusted remote, e.g., cloud, providers without compromising data confidentiality. The chunks may be encrypted upon upload and decrypted after download. Lookups may be done at the remote storage, but such an arrangement will likely require that the storage provider have more information, potentially decreasing the security of the chunks.

Because in some implementations the only data written is new data appended to an existing stream, streams can grow quite large. The chunking and storage techniques just described support archiving contiguous portion of a stream into segments while still allowing efficient querying. The storage location of each chunk can be configured, allowing for data in the same stream to be stored across different storage providers. Hence, in various implementations of this disclosure, streams may be stored locally, remotely on untrusted servers, replicated for reliability, and/or striped across multiple storage providers for cost effectiveness.

Applications using the framework may be able to prioritize storage requirements of space, performance, cost, and reliability.

Figure 4:
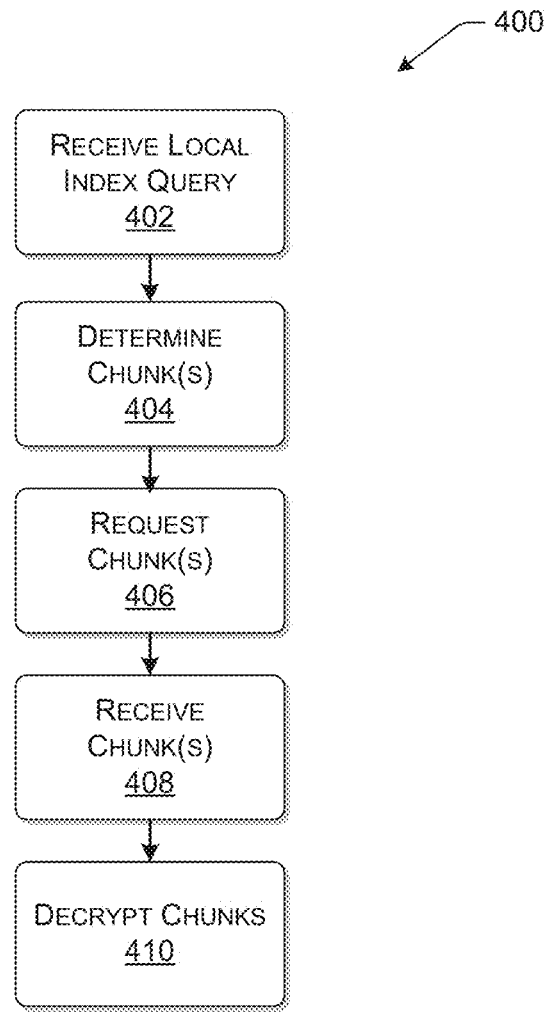
FIG. 4 is a block diagram depicting an example process architecture that can perform data retrieval for connected devices.

FIG. 4 is a block diagram depicting an example architecture 400 of processes that the data management framework can perform to facilitate retrieval of data in a data management framework. In some examples the data management framework 114 will perform all processing. In other implementations, some or all of the architecture 300 could be performed at the device(s) 102, or elsewhere.

At 402, the architecture 400 receives a query of an index. In some examples, the query is made on a local index, such as the index created in 314. Alternatively, or additionally, the query could be done on multiple indices. The indices may be of streams from any number of monitoring devices 102 including, assuming appropriate authorization, streams associated with devices associated with a user other than the querying user. A non-illustrated pre-cursor to 402 may be receiving the index locally. For example, if the index or a newer version of the index is stored remotely. In other implementations, one index may include information about all data streams from all sensors, and a search is done on that index.

The index may include at least time and tag information about the data indexed. Accordingly, a query may request entries from a certain time period or for entries tagged with certain tags, or both. The index may also store additional information that could be searchable via the query.

At 404, the architecture 400 determines a chunk or chunks that contain information satisfying the query. In some examples, individual records are not searched in response to the query. Instead, chunks, which contain multiple records, are returned. Because of the nature of the chunks, the determined chunk may contain one or more records that do not match the search query, in addition to the records that satisfy the query.

At 406, the architecture 400 request the one or more chunks determined at 404 to include records satisfying the query made at 402. In some examples, the chunks are stored remotely, such as on a cloud-based storage system, and thus the chunks are requested from the remote storage system. In other implementations, the chunk(s) may be otherwise retrieved from storage.

At 408, the requested chunks are received by the architecture 400, and, if required, the chunks are decrypted at 410. As discussed above, encrypting the chunks may facilitate more relaxed security standards at the remote storage, particularly when the index is stored, and all queries are done, locally.

Example implementations of the architectures 300, 400 may be carried out using a plurality of stream APIs. Such stream APIs according to one implementation include:

| Function | Description |
| --- | --- |
| createStream(name,R/W,policy) | Create a data stream with specified policy properties (e.g., stream type, storage location, protection specifics, sharing rules) |
| openStream(name,R/W) | Open an existing data stream |
| deleteStream(name) | Delete an existing data stream |
| append([tag,value]) | Append the list of values with corresponding tags. All get same timestamp |
| append([tag],value) | Append data labeled with potentially multiple tags |
| getLatest( ) | Retrieve latest <time,tag,value> tuple inserted across all tags |
| get(tag) | Retrieve latest <time,tag,value> tuple inserted for the specified tag |
| getAll(tag) | Retrieve all time-sorted <time,tag,value> tuples for specified tag |
| getAll(tag,$t_{start}$,$t_{end}$) | Range query: get all tuples for tag in the specified time range |
| getAll(tag,$t_{start}$,$t_{end}$,$t_{skip}$) | Sampling range query |

-continued

| Function | Description |
| --- | --- |
| getKeys(tag$_{start}$,tag$_{end}$) | Retrieve all tags in the specified time range |
| sealStream( ) | Seal the current stream segment and create a new one for future appends |
| getAllSegmentIDs( ) | Retrieve the list of all segments in the stream |
| deleteSegment(segmentID) | Delete the specified segment in the current stream |
| grant(appID) | Grant appID read access |
| revoke(appID) | Revoke appId's read access |

In this example implementation, applications are identified by the <HomeID, AppID> pair, and are the principals that read or write. The application may be stored and/or running on the device 108, for example. In this example, on create and open, the application specifies the policies, which may include the stream's type, storage location, and protection and sharing requirements. In other examples, additional or other policies may also be specified by the application. Moreover, although examples describe the application specifying the policies, a user, such as the owner, may specify the policies. In this example, two types of streams may be specified: ValueStream or FileStream. In this implementation, ValueStream is useful for small data values such as temperature readings, and FileStream is useful for larger values, such as images or videos. The two streams may be stored differently.

In this example implementation, each stream has one writer (e.g., the owner) and one or more readers. Writers add time-tag-value records to the stream using append. Records can have multiple tag-value pairs and multiple tags for a value. Tags and values are application-defined types that, in an example implementation, implement IKey and IValue interfaces, allowing for hashing, comparing, and/or serializing. Also in this implementation, writers can grant and revoke read access to/from other applications. Readers can filter and query data using tags and time (get*). The APIs listed and described above support querying for the latest record, the latest record for a tag, temporal range and sampling queries, and range queries on tags. In this framework, range queries return an iterator, which fetches data on demand, when accessed.

Figure 5:
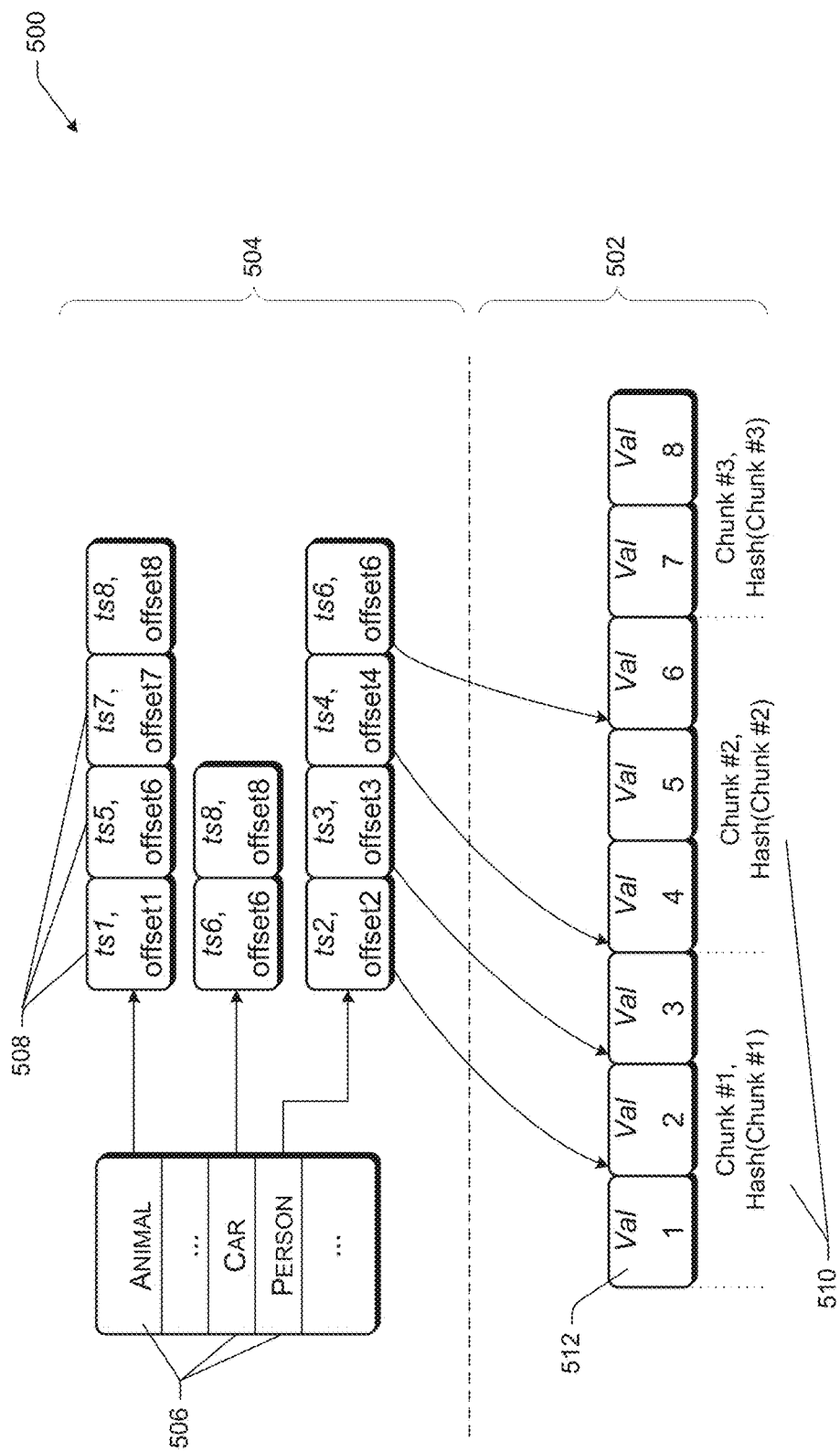
FIG. 5 is a block diagram depicting an example data layout for implementing data management for connected devices as described herein.

In this example implementation, an owner first creates a new data, stream and appends data records to it. FIG. 5 illustrates a data layout 500 for a stream. This stream includes image data relating to a ValueStream for information from a surveillance camera such as a security camera that may be installed on the exterior of a home or other building. As shown, 500 includes a log of data records 502 and an index 504 that maps a tag 506 to a list of data item identifiers 508. In this example, item identifiers 508 are fixed-size entries and the list of item identifiers in the index is sorted by time (e.g., time stamps, ts). This arrangement may enable efficient binary searches for range and sampling queries. In the example arrangement, the index is memory resident and may be backed by a file. Records in the log 502 may be stored on a disk, e.g., remotely, and retrieved when referenced by the application. The log 502 is divided into chunks 510 of contiguous data records 512. The chunks 510 may be fixed in size.

To reduce the memory footprint of the index, which can grow large over time, streams may be archived. In some examples, the stream is segmented, and each segment has its own log and corresponding index. Thus, a stream may be viewed as a time-ordered list of segments. In this example, if the size of the index in memory exceeds a configurable threshold (index$_{tresh}$), the latest segment is sealed, its index is flushed to disk, and a new segment with a memory resident index is created. In this framework, writes to the stream go to the latest segment and all other segments of the stream are read-only entities. The index for the latest segment of the stream may be memory resident and backed by a file, e.g., stored remotely.

Figure 6:
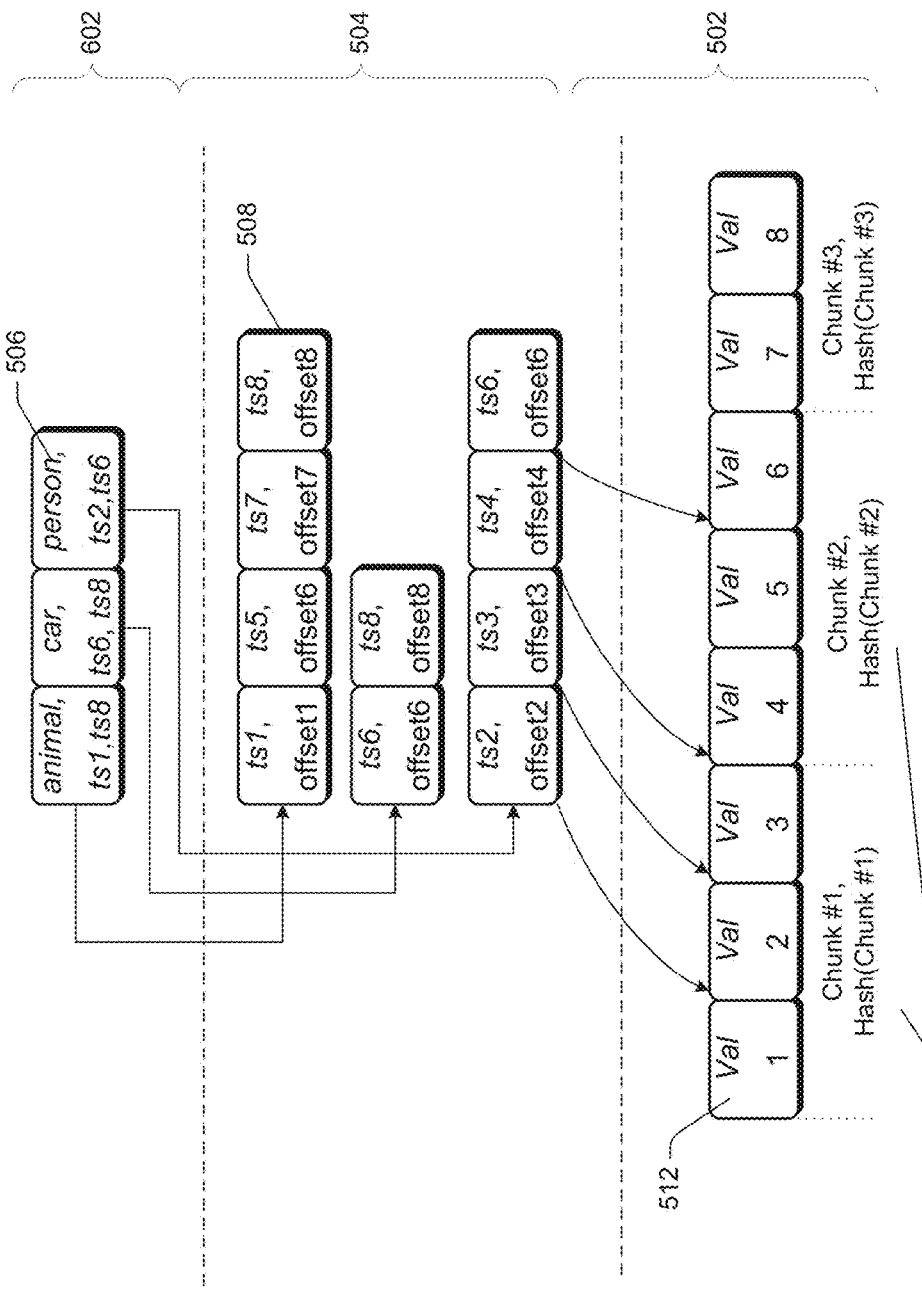
FIG. 6 is a block diagram depicting an example data layout for implementing data management for connected devices as described herein.

The layout of a segment that has been sealed is illustrated in FIG. 6. FIG. 6 is similar to FIG. 5, except that a compact index 602 has been created for local storage. The compact index 602 includes the tags 506, and for each tag, the timestamp (ts) for the first and last identifier in the corresponding item identifier list, as well as the location of this list in the index. In this example, the index 504 may also be stored on disk, with the compact index being stored locally. In some implementations, the index may also be stored remotely, but fetched locally for local queries.

Uploading of stream data according to an example now will be described. In the described example, each principal (e.g., <HomeID, AppID> pair) may be associated with a private-public key pair, and each stream may be encrypted with a secret key, $K_{con}$. The secret key may be generated by the owner. When a stream is synced or closed, the framework may flush the index to disk, chunk the segment log, compress and encrypt the chunks, and generate a list of the chunks, herein, a ChunkList. The ChunkList is, for each segment, an ordered list of all chunks in the segment and their corresponding hashes (shown as Hash(Chunk #1), Hash(Chunk #2), etc. in FIG. 6. These functions preferably are carried out on all new segment that may have been modified due to data appends.

In the example, the framework generates the stream's integrity meta-data ($MD_{int}$) for uploading with the stream data. When n is the number of segments within the stream, MDint is computed according to Equation (1), as follows:

$$MD_{int} = \Sigma_{K_{Priv}^{owner}}[H[TTL||H[I_1]|| \ldots ||H[I_n]|| \\ H[CL_1]|| \ldots ||H[CL_n]]] \quad (1)$$

TTL provides guarantees on data freshness, and thus may ensure that data fetched from a storage server is not older than a configurable writer-specified consistency period, and no older than any previously retrieved data. $MD_{int}$ is a signed hash of the duration for which the owner guarantees data freshness (TTL) and the per-segment index and ChunkList hashes. Chunks, the updated ChunkList and the modified index may be uploaded to the storage server. Thereafter, $MD_{int}$ may be uploaded. The stream metadata, then be uploaded to a metadata server. The metadata server may be a trusted key server to prevent unauthorized updates. The metadata/key server may distribute the keys and the metadata of a stream. In other implementations, information to be stored on the metadata server may be replicated on 2f+1 servers, to tolerate up to f malicious servers. Alternatively, a Byzantine quorum system could be employed.

When used, the metadata/key server may maintain the principal to public-key mappings as well as a symmetric content key to encrypt and decrypt data ($K_{con}$), principals that have access to the data (including the owner), the location of $MD_{int}$, and per-segment location and key version. $K_{con}$ may be encrypted for storage, with one entry for each principal that has access to the stream using their public key.

To grant application read access, in one implementation, the owner updates stream metadata with $K_{con}$ encrypted with the reader's public key. Revoking read access also involves updating stream metadata, using the APIs described above. In one implementation, an owner removes the appropriate principal from the accessor's list, removes the encrypted content keys, and rolls forward the content key and key version for all valid principals. In this example, all chunks in a segment are encrypted using the same version of the content key.

To read stream data from a chunk, the framework may open a stream and fetch stream metadata. Using this information, the stream's integrity metadata $MD_{int}$ may then be fetched, e.g., from untrusted storage. The integrity metadata may be verified using the owner's public key and the freshness may be verified using the TTL in $MD_{int}$. The reader then fetches the index and ChunkList for every segment of the stream and verifies their integrity using $MD_{int}$.

An owner may store new data records in the stream upon verifying the integrity of index data. For readers, once index and ChunkList integrity verifications for all segments are complete, the index is used to identify chunks that should be fetched. As described above, in this example chunk level integrity is checked lazily, e.g., by downloading the chunks and verifying their integrity using the segment's ChunkList. The verified chunk may be decrypted and/or decompressed in this example, and the chunks may be stored locally, e.g., in a cache, for subsequent reads. As noted above, the chunk(s) retrieved may have information additional to the information actually requested by the query. More specifically, each chunk may have a plurality of records, some of which satisfy the query and some of which may not. Thus, when the chunks are stored in cache, subsequent, different queries may also be satisfied by the cached chunks, resulting in more efficient retrieval of requested information.

An example system such as that just described may be implemented using C# over the .NET framework v4.5. The example implementation may be integrated in the HomeOS platform, although it may also be used as an independent library. The client library may use Protocol Buffers for data serialization and may be able to use Windows Azure and Amazon S3 for remote storage. The implementation may use the respective libraries for reading and writing data remotely. On some types of remote storage, each segment may be mapped to a container, the index and log of data were mapped to a blob, and individual chunks were mapped to parts of the blob containing the log of data. On other types of remote storage, each segment was mapped to a bucket, the index was mapped to an object, and chunks of the log mapped to individual objects.

Example Clauses

A: A method comprising: receiving, from a plurality of devices, a stream of time-series data comprising a plurality of records and a time identification associated with each of the records; associating one or more tags with individual ones of the records; chunking the stream into a plurality of contiguous chunks, each of the contiguous chunks including a plurality of records; creating an index associating the time identification and the one or more tags; transmitting each of the chunks to a first, remote storage location; and storing the index in a second, local storage location.

B: A method as paragraph A recites, wherein the plurality of devices are associated with a first physical location associated with a first user and further comprising: receiving a query of the index; determining one or more records satisfying the query; and retrieving from the first, remote storage location the one or more chunks containing the one or more records satisfying the query.

C: A method as either paragraph A or B recites, wherein the query includes at least one of a temporal requirement or a tag identification.

D: A method as any one of paragraphs A-C recites, wherein the chunks retrieved include records additional to the one or more records satisfying the query.

E: A method as any one of paragraphs A-D recites, further comprising instructing presentation of a user interface through which a user may query the index, wherein the receiving the query of the index is based on a user interaction with the user interface.

F: A method as any one of paragraphs BE recites, wherein the first physical location is a first house, the plurality of devices are surveillance devices at the first house, and the second physical location is a second house.

G: A method as any one of paragraphs A-F recites, wherein the index is free of the records.

H: A computer readable medium having computer-executable instructions thereon, the computer-executable instructions to configure a computer to perform a method as any one of paragraphs A-G recite.

I: A device comprising: a computer-readable media having computer-executable instructions thereon to configure a computer to perform a method as any one of paragraphs A-G recites, the processing unit adapted to execute the instructions to perform the method as any one of paragraphs A-G recites.

J: A system comprising: one or more computing devices communicatively coupled to one or more monitoring devices, each of the monitoring devices having one or more sensors, the one or more computing devices including: a communication interface for receiving streams of data records from the sensors, a tagging module for associating one or more tags with objects in the data records to create tagged data records, an indexing module for creating a searchable index comprising associations between the tags and time stamps in the tagged data records, and a chunking module for separating the tagged data records into a plurality of contiguous chunks, each chunk comprising a plurality of the tagged data records.

K: The system as paragraph J recites, further comprising a query interface communicatively coupled to the one or more computing devices through which the searchable index is queried.

L: The system as paragraph J or paragraph K recites, further comprising: first storage communicatively coupled to the one or more computing devices for storing the plurality of chunks; and second storage communicatively coupled to the one or more computing devices for storing the searchable index.

M: A device as any one of paragraphs J-L recites, the one or more computing devices further including an encryption module for encrypting the chunks.

N: One or more computer readable media having thereon computer-executable instructions, the computer-executable instructions, upon execution, configuring a computer to perform operations comprising: receiving a stream of time-series data from a surveillance device surveying a first location associated with a first user, the time-series data including one or more records sensed by the surveillance device and one or more time stamps for individual of the one or more records; storing, on a storage device local to the first location, an index that associates individual ones of the one or more time stamps with one or more tags, each of the tags identifying one or more features of the one or more objects, causing at least a portion of the stream of time-series data to be stored at a remote storage device; receiving a query of the index from a second user associated with a second location different from the first location; identifying, in response to the query, one or more segments of the time-series data that satisfy the query; and retrieving the one or more segments of the time-series data that satisfy the query from the remote storage device.

O: The media as paragraph N recites, wherein the surveillance device comprises a camera, and the records comprise images captured by the camera.

P: The media as paragraph N or O recites, wherein the tags are textual identifiers of objects in the images captured by the camera.

Q: The media as paragraph N recites, wherein the surveillance device comprises at least one of a thermometer, a proximity detector, or a utility meter.

R: The media as any one of paragraphs N-Q recites, wherein the tag is received with the stream of time-series data.

S: The media as any one of paragraphs N-R recites, wherein the causing the at least the portion of the stream to be stored includes chunking the stream and transmitting the chunks to a storage device.

T: The media as paragraph S recites, further comprising compressing the chunks.

U: The media as paragraph S or paragraph T recites, further comprising encrypting the chunks.

V: The media as any one of paragraphs SU recites, wherein the index comprises an index of the chunks.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 102 and/or 108 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, is understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be any of X, Y, or Z, or a combination or sub-combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A method comprising:
receiving, from a device associated with a first physical location, a stream of time-series data of one or more of surveillance cameras, the stream comprising a plurality of records ordered in time, each record having a timestamp and one or more tags, wherein the plurality of records including a first record having a first timestamp and a first tag, a second record having a second timestamp and a second tag, and a third record having a third timestamp and the first tag, wherein the first tag and second tag are different tags, and wherein the first record and the second record are temporally contiguous and the third record is temporally after the first record and the second record;
chunking the stream into a first chunk and a second chunk, the first chunk comprising the first record and the second record and the second chunk comprising the third record;
generating an index that associates the first tag with the first timestamp and the third timestamp and that associates the second tag with the second timestamp, wherein the index maps the one or more tags to a list of data item identifiers, each data item identifier including a timestamp for a corresponding tag, and wherein the list of data item identifiers is sorted by time to enable efficient binary searches;

generating a compact index, the compact index including the one or more tags, wherein each tag of the one or more tags including a timestamp for a first identifier and a last identifier in the corresponding list of data item identifiers and a location of the corresponding list of data item identifiers in the index;

storing the compact index in local storage;

transmitting the first chunk and the second chunk to at least one first, remote storage location;

storing the index in a second storage location;

receiving a query of the index from a second user device associated with a second physical location, the query including a request to return records associated with the first tag;

accessing the compact index to determine the location of the corresponding list of data item identifiers in the index based on the query;

determining from the index that the first chunk and the second chunk are associated with the first tag; and retrieving from the first, remote storage location the first and second chunks.

2. The method of claim 1, wherein the query includes at least one of a temporal requirement or a tag identification.

3. The method of claim 2, wherein the one or more chunks retrieved include records additional to the one or more records satisfying the query.

4. The method of claim 1, further comprising instructing presentation of a user interface through which a user may query the index, wherein the receiving the query of the index is based on a user interaction with the user interface.

5. The method of claim 1, wherein the first physical location is a first house, the plurality of devices are surveillance devices at the first house, and the second physical location is a second house.

6. The method of claim 1, wherein the index is free of the records.

7. A system comprising:
one or more computing devices communicatively coupled to one or more monitoring devices, each of the monitoring devices having one or more sensors, the one or more computing devices including one or more non-transitory computer storage media having thereon the computer-executable instructions, upon execution by the computing devices perform operations including:

receiving, from a first computing device of the one or more computing devices associated with a first physical location, streams of data records from the sensors of one or more of a surveillance camera, the stream comprising a plurality of data records ordered in time, each data record having a timestamp and one or more tags, wherein the plurality of data records includes a first record having a first timestamp and a first tag, a second record having a second timestamp and a second tag, and a third record having a third timestamp and the first tag, wherein the first record and the second record are temporally contiguous and the third record is temporally after the first record and the second record;

creating a searchable index, the index associating the first tag with the first timestamp and the third timestamp and associating the second tag with the second timestamp, wherein the searchable index maps the one or more tags to a list of data item identifiers, each data item identifier including a timestamp for a corresponding tag, and wherein the list of data item identifiers is sorted by time to enable efficient binary searches;

separating the stream into a plurality of contiguous chunks including a first chunk comprising the first record and the second record and a second chunk comprising the third record;

creating a compact index, the compact index including the one or more tags, wherein each tag of the one or more tags including a timestamp for a first identifier and a last identifier in the corresponding list of data item identifiers and a location of the corresponding list of data item identifiers in the index; and storing the compact index in local storage;

transmitting the first chunk and the second chunk to at least one first, remote storage location;

storing the index in a second storage location;

receiving a query of the index from a second computing device of the one or more computing devices associated with a second physical location, the query including a request to return records associated with the first tag;

accessing the compact index to determine the location of the corresponding list of data item identifiers in the index based on the query;

determining from the index that the first chunk and the second chunk are associated with the first tag; and retrieving from the first, remote storage location the first and second chunks.

8. The system of claim 7, wherein the operations further include encrypting the chunks.

9. One or more non-transitory computer storage media having thereon computer-executable instructions, the computer-executable instructions, upon execution, configuring a computer to perform operations comprising:

receiving a stream of time-series data of one or more surveillance devices surveying a first location associated with a first user, the stream of time-series data including a plurality of records sensed by the one or more of surveillance devices ordered in time, each record having a timestamp and one or more tags, wherein the plurality of records including a first record having an associated first timestamp and a first tag, a second record having an associated second timestamp and a second tag, and a third record having an associated third timestamp and the first tag, wherein the first tag identifying a first feature of the first location being associated with the first record and the third record and the second tag identifying a second feature of the first location being associated with the second record, wherein the second feature being different from the first feature, and wherein the first record and the second record are temporally contiguous and the third record is temporally after the first record and the second record;

storing, on a storage device local to the first location, an index that associates the first tag with the first timestamp and the third timestamp and that associates the second tag with the second timestamp, wherein the index maps the one or more tags to a list of data item identifiers, each data item identifier including a timestamp for a corresponding tag, and wherein the list of data item identifiers is sorted by time to enable efficient binary searches;

generating a compact index, the compact index including the one or more tags, wherein each tag of the one or more tags including a timestamp for a first identifier and a last identifier in the corresponding list of data item identifiers and a location of the corresponding list of data item identifiers in the index;

storing the compact index in local storage;

causing at least a portion of the stream of time-series data to be stored at a remote storage device as a first chunk comprising the first record and the second record and a second chunk comprising the third record;

receiving a query of the index from a second user associated with a second location different from the first location, the query requesting records associated with at least one of the first tag or the second tag;

accessing the compact index to determine the location of the corresponding list of data item identifiers in the index based on the query;

identifying, in response to the query requesting records associating the first tag, the first chunk and the second chunk; and retrieving the first chunk and the second chunk from the remote storage device.

10. The media of claim 9, wherein each of the one or more surveillance devices comprises a camera, and the records comprise images captured by the camera.

11. The media of claim 10, wherein the tags are textual identifiers of objects in the images captured by the camera.

12. The media of claim 9, wherein the surveillance device comprises at least one of a thermometer, a proximity detector, or a utility meter.

13. The media of claim 12, wherein the tag is received with the stream of time-series data.

14. The media of claim 12, wherein the causing the at least the portion of the stream to be stored includes chunking the stream and transmitting the chunks to a storage device.

15. The media of claim 14, further comprising compressing the chunks.

16. The media of claim 14, further comprising encrypting the chunks.

17. The media of claim 14, wherein the index comprises an index of the chunks.

\* \* \* \* \*